(12) United States Patent
Diekmann et al.

(10) Patent No.: US 11,156,222 B2
(45) Date of Patent: Oct. 26, 2021

(54) ELECTRIC FLUID PUMP

(71) Applicant: Mahle International GmbH, Stuttgart (DE)

(72) Inventors: Johannes Diekmann, Schorndorf (DE); Andrej Rul, Stuttgart (DE); Benjamin Weimann, Stuttgart (DE)

(73) Assignee: Mahle International GmbH

( * ) Notice: Subject to any disclaimer, the term of this patent is extended or adjusted under 35 U.S.C. 154(b) by 145 days.

(21) Appl. No.: 16/112,756

(22) Filed: Aug. 26, 2018

(65) Prior Publication Data
US 2019/0063439 A1 Feb. 28, 2019

(30) Foreign Application Priority Data
Aug. 28, 2017 (DE) .......................... 102017214997.3

(51) Int. Cl.
| F04D 13/06 | (2006.01) |
| H02K 11/00 | (2016.01) |
| H02K 5/22 | (2006.01) |
| H02K 5/12 | (2006.01) |
| H02K 11/30 | (2016.01) |
(Continued)

(52) U.S. Cl.
CPC ......... *F04D 13/0653* (2013.01); *F04D 15/00* (2013.01); *F04D 29/586* (2013.01); *H02K 5/12* (2013.01); *H02K 5/18* (2013.01); *H02K 5/225* (2013.01); *H02K 7/083* (2013.01); *H02K 7/14* (2013.01); *H02K 9/197* (2013.01); *H02K 11/0094* (2013.01); *H02K 11/30* (2016.01); *F04D 29/5806* (2013.01); *F05D 2300/43* (2013.01); *H02K 2211/03* (2013.01)

(58) Field of Classification Search
CPC .. F04D 13/06; F04D 13/0606; F04D 13/0646; F04D 13/0653; F04D 25/082; F04D 29/5806
See application file for complete search history.

(56) References Cited

U.S. PATENT DOCUMENTS

| 5,818,131 A * | 10/1998 | Zhang .................. F04D 29/048 310/15 |
| 9,366,259 B2 | 6/2016 | Binder et al. |
(Continued)

FOREIGN PATENT DOCUMENTS

| CN | 107346077 | * 8/2017 | ....... G02F 1/133308 |
| DE | 10025190 A1 | 12/2001 | |
(Continued)

OTHER PUBLICATIONS

WO2017057437 translation (Year: 2017).*
(Continued)

*Primary Examiner* — Devon C Kramer
*Assistant Examiner* — David N Brandt
(74) *Attorney, Agent, or Firm* — Fishman Stewart PLLC

(57) ABSTRACT

An electric fluid pump may include a pump housing and an electric motor arranged in the pump housing. A rotor of the electric motor may have a rotor shaft and may be mounted in a stator of the electric motor so as to be rotatable about an axis of rotation. The pump housing may be divided into a dry region and a wet region in which the rotor may be disposed. The dry region and the wet region may be separated by a stator support piece which may at least regionally enclose the stator.

19 Claims, 2 Drawing Sheets

(51) Int. Cl.
*F04D 15/00* (2006.01)
*F04D 29/58* (2006.01)
*H02K 5/18* (2006.01)
*H02K 7/08* (2006.01)
*H02K 7/14* (2006.01)
*H02K 9/197* (2006.01)

(56) References Cited

U.S. PATENT DOCUMENTS

2004/0062664 A1* 4/2004 Weigold .............. F04D 29/5813
              417/357
2013/0147291 A1* 6/2013 Woolmer ................ H02K 9/28
              310/58
2017/0302124 A1* 10/2017 Ehrsam ................... F04D 29/22

FOREIGN PATENT DOCUMENTS

| DE | 102011119625 A1 * | 5/2013 | ......... F04D 29/5806 |
| DE | 102012222358 A1 | 6/2014 | |
| WO | 02035098 A1 | 5/2002 | |
| WO | 2007095982 A1 | 8/2007 | |
| WO | 2017/057437 A1 | 4/2017 | |
| WO | WO-2017057437 A1 * | 4/2017 | ........... H02K 11/215 |

OTHER PUBLICATIONS

CN107346077 translation (Year: 2017).*
DE102011119625 translation (Year: 2021).*
English abstract for DE-10025190.
Chinese Office Action dated Aug. 14, 2020 for copending Chinese Patent Application No. 201810985962.5 (with English translation).

* cited by examiner

ELECTRIC FLUID PUMP

CROSS REFERENCE TO RELATED TO APPLICATIONS

This application claims priority to German Patent Application No. DE-102017214997.3, filed Aug. 28, 2017, which is hereby incorporated by reference in its entirety.

TECHNICAL FIELD

The invention relates to an electric fluid pump.

BACKGROUND

A generic electric fluid pump is known for example from DE 10 2012 222 358 A1 and has a housing in which an electric motor is arranged. The electric motor has a stator and a rotor with a shaft, wherein the rotor is mounted rotatably in the stator. By means of a rotation of the rotor, a pump impeller fixed to the shaft is driven, and a fluid is conveyed by the pump impeller. Normally, the waste heat generated in the rotor is dissipated via the fluid to be conveyed, and the waste heat generated in the stator is dissipated via the housing. The housing is in this case divided into a dry region and a wet region, wherein the rotor is surrounded in the wet region by the fluid to be conveyed, and electrical components of the electric motor—such as for example control electronics and the stator—are arranged in the dry region. To protect the electrical components in the dry region, the latter must be separated in fluid-tight fashion from the wet region.

A number of solutions in this regard are known from the prior art. For example, the generic DE 10 2012 222 358 A1 describes a fluid pump in which the stator and the control electronics are arranged in a separate containment can and are thus separated in fluid-tight fashion from the wet-running rotor. It is disadvantageously the case that the stator is situated within the containment can, and the heat generated in the stator can only be dissipated via the containment can to the housing and/or to the fluid to be conveyed. The cooling of the stator and of the control electronics in the containment can is thus impaired. Furthermore, the containment can constitutes an additional component, whereby the overall costs and the production effort are increased.

It is therefore the object of the invention to specify, for a fluid pump of the generic type, an improved or at least alternative embodiment in which the fluid pump is cooled more effectively.

Said object is achieved according to the invention by means of the subject matter of independent Claim 1. The dependent claims relate to advantageous embodiments.

SUMMARY

The present invention is based on the general concept of increasing the release of heat from a stator in an electric fluid pump. Here, the fluid pump has a pump housing and an electric motor arranged in the pump housing. A rotor of the electric motor has a rotor shaft and is mounted in a stator of the electric motor so as to be rotatable about an axis of rotation. Here, the pump housing is divided into a dry region and a wet region which comprises the rotor. According to the invention, the dry region and the wet region are separated by a stator support piece which at least regionally encloses the stator.

In this way, the stator is at least regionally enclosed by material of the stator support piece, such that the heat generated in the stator is easily released to the material of the stator support piece and, in this way, is dissipated from the stator. By contrast to a conventional fluid pump, in which the heat generated in the stator is released as thermal radiation via an air gap which surrounds the stator and which has relatively low thermal conductivity, it is the case in the fluid pump according to the invention that the release of heat is realized by heat conduction, which leads to much more efficient cooling. It is advantageously also possible, in comparison to a containment can that is conventionally used, for the gap between the rotor and the stator to be reduced, whereby power losses in the fluid pump according to the invention can be considerably reduced.

The stator is at least regionally enclosed by the stator support piece, and is thus furthermore protected from the fluid to be conveyed. Expediently, the stator is enclosed by the stator support piece in particular in the direction of the wet region, whereas those regions of the stator which face towards the dry region can project out of the stator support piece. In this way, it is for example possible for the stator enclosed by the stator support piece to be easily electrically contacted to the outside.

To separate the wet region surrounding the rotor from the dry region, the stator support piece may for example be of hollow cylindrical design, and the rotor surrounded by the fluid may be arranged in a cylindrical cavity of the stator support piece. Here, the rotor may either be arranged so as to be rotatable about the rotationally fixed rotor shaft, or else may be fixed to the rotatable rotor shaft. The stator support piece may then be fixed to the pump housing, such that the wet region is delimited by the cavity of the stator support piece and the dry region is arranged at least regionally between a shell surface of the stator support piece and the pump housing. In this way, the electric fluid pump can be designed in compact form, and the dry region can be separated from the wet region.

Provision may advantageously be made for the stator support piece to be formed by a plastics body into which the stator is at least regionally embedded. The plastics body can be produced inexpensively and has an electrically insulating action, such that, in the stator embedded in the plastics body, a leakage current and a short circuit are prevented. Preferably, the plastics body is produced by means of a plastics overmoulding process, whereby the plastics body can advantageously be produced in cost-saving fashion.

Here, the plastics body may be composed of a thermally conductive plastic in order to better dissipate the heat generated in the stator. Alternatively or in addition, the plastics body may have a protective layer on an inner surface facing towards the rotor, which protective layer protects the plastics body from the fluid to be pumped. The protective layer may be applied to the plastics body by means of a plastics overmoulding process, and is expediently resistant to the fluid to be pumped. Accordingly, it is for example possible for the plastics body to be composed of an inexpensive material which is not resistant to the fluid to be pumped. The protective layer arranged on the inner surface of the plastics body may then be composed of a different material, which is resistant to the fluid to be pumped. In this way, the costs for producing the plastics body can be considerably reduced. Furthermore, in this way, the selection of the thermally conductive materials for the plastics body is expanded, because said materials do not need to exhibit resistance to the fluid to be pumped. The protective layer may in this case amount to a few micrometres to a few millimetres, such that the production costs are also not considerably increased by the protective layer composed of expensive materials. It is advantageously possible for the plastics body to be produced from the thermally conductive plastic by means of a first single-stage or multi-stage plastics overmoulding process, and for the protective layer to subsequently be produced from a fluid-resistant plastic by means of a second plastics overmoulding process. In this way, the costs and the effort in the production of the plastics body can be considerably reduced.

Accordingly, it is for example possible for the thermally conductive plastic to be a polyamide, also filled with filler materials such as for example glass fibre. The polyamide has a specific volume resistance of between $10^{10}$ and $10^{13}$ $\Omega*m$ and a thermal conductivity of between 0.3 and 0.4 W/(m*K), and can be used for fluid pumps of a low power class with low flow rates. The plastics body composed of the polyamide is inexpensive, whereby the production costs for the fluid pump can advantageously be reduced. The fluid-resistant plastic may for example be a polypropylene sulphide, also filled with filler materials such as for example glass fibre. The polypropylene sulphide has a specific volume resistance of between $10^{10}$ and $10^{15}$ $\Omega*m$ and a thermal conductivity of between 0.3 and 0.4 W/(m*K). Since the protective layer may amount to a few micrometres to a few millimetres, the characteristics of the protective layer may however differ from the values stated here.

In an alternative refinement of the plastics body, provision is advantageously made for the thermally conductive plastic of the plastics body to have a specific volume resistance of greater than $10^{10}$ $\Omega*m$ and a thermal conductivity of greater than 6 W/(m*K). The thermally conductive plastic with these characteristics may be used in particular for fluid pumps of a high power class with high flow rates. Alternatively or in addition, the fluid-resistant plastic of the protective layer may have a thermal conductivity of less than 2 W/(m*K). Accordingly, it is for example possible for the thermally conductive plastic to be a polypropylene sulphide, also filled with filler materials such as for example glass fibre. As already discussed above, the polypropylene sulphide has a specific volume resistance of between $10^{10}$ and $10^{15}$ $\Omega*m$ and a thermal conductivity of between 0.3 and 0.4 W/(m*K). The characteristics of the protective layer may however differ from the values stated here owing to a small layer thickness.

The plastics body composed of the thermally conductive plastic may advantageously be used for pre-warming the fluid to be conveyed, for example in the warm-up phase of an internal combustion engine. For this purpose, the electric motor can, at low rotational speeds, be heated relatively intensely by means of an additional exciter current. The additional exciter current may in this case be demanded by the set of control electronics of the fluid pump by means of a heating command, also in response to a demand from a superordinate controller. The heating command may for example be an ON command or an OFF command or may comprise a setpoint value of an excess heating power to be generated. Here, the set of control electronics of the fluid pump applies a voltage which is relatively excessively high in relation to the rotational speed of the electric motor to the stator. The excess power generated is, as heating power, converted into waste heat and is released by the plastics body to the fluid to be conveyed. The efficiency of components pre-warmed by means of the fluid to be conveyed can advantageously be increased in this way. Furthermore, costs for additional components that have conventionally been used for pre-warming the fluid to be conveyed are omitted.

Alternatively, the fluid pump may have a heating device which is fixed in the fluid pump such that it can be flowed around by the fluid to be conveyed. The heating device preferably has at least one PTC (Positive Temperature Coefficient) element.

In one refinement of the fluid pump according to the invention, provision is made for the dry region to be sealed off radially and/or axially from the wet region by means of at least one seal which bears against the stator support piece. The seal is expediently composed of an elastic material—for example rubber—and may be an areal seal or a ring-shaped seal. In the case of a stator support piece bearing against the pump housing, the seal may be arranged with sealing action between the pump housing and the stator support piece. By means of the seal, it is advantageously possible for the dry region to be sealed off from the wet region and for electrically conductive components of the fluid pump—for example a set of control electronics—to be protected.

Provision is alternatively made for the stator support piece to be fixed to the pump housing, and thus for the dry region to be sealed off radially and/or axially from the wet region. The stator support piece may for example be fixed to the pump housing in cohesive fashion, preferably by means of an ultrasound welding process or by means of a plastics moulding-on process, such that the dry region is separated in fluid-tight fashion from the wet region.

In order to more effectively dissipate the heat generated in the stator, provision is advantageously made for a shell surface of the stator support piece to be formed by a radially outwardly directed outer surface of the stator, and for the stator support piece to bear with the shell surface against an inner surface of the pump housing. The heat generated in the stator can in this way be released via the outer surface of the stator directly to the pump housing, and the stator can be cooled more efficiently. It is advantageously possible for a thermally conductive coating to be arranged between the shell surface of the stator support piece and the inner surface of the pump housing, in order to avoid a thermally insulating air gap between the pump housing and the stator and thus to further improve the release of heat from the stator to the pump housing. The thermally conductive coating may for example be a thermally conductive foil or preferably a thermally conductive paste.

Provision is advantageously made for a first bearing point and a second bearing point of the rotor to be arranged within the pump housing. The two bearing points may for example be arranged in a stator support piece which encases the rotor, or on the pump housing, and the rotor may be mounted on the stator support piece or on the pump housing. Provision may advantageously be made for the stator support piece to have a fixing collar which is arranged around the second bearing point and which separates the wet region axially and/or radially from the dry region. In this way, the fluid pump can be designed to be more compact. Furthermore, a fluid pump designed in this way can be combined in accordance with the modular principle with different pump impellers and with different pump impeller housings.

In one refinement of the fluid pump according to the invention, provision is made for the stator support piece with the stator to be fixed axially and/or radially in the pump housing in non-positively locking, cohesive or positively locking fashion. A radial or axial fixing may be realized for example by means of a tongue-and-groove connection or by means of a screw connection or by means of a clamping connection or by means of an adhesive connection.

For the conveyance of the fluid, provision is made for the fluid pump to have a pump impeller, which is connected in terms of drive to the rotor, in a pump impeller housing, wherein a pump impeller wet region of the pump impeller housing is connected in fluid-conducting fashion to the wet region of the pump housing. The pump impeller housing may in this case be fixed to the pump housing and sealed off to the outside. The pump impeller may be connected in terms of drive to the rotor for example by means of the rotor shaft, wherein the rotor and the pump impeller are expediently fixed to the rotor shaft. In this embodiment, the rotor shaft, the rotor and the pump impeller form a unit and are mounted for joint rotation about the axis of rotation. It is alternatively possible for the rotor to be mounted on the rotationally fixed rotor shaft and for the pump impeller to be fixed to the rotor. The pump impeller and the rotor then form a unit, which is mounted on the rotationally fixed rotor shaft so as to be rotatable about the axis of rotation.

Provision is advantageously made for a set of control electronics to be fixed in non-positively locking or positively locking or cohesive fashion in the dry region of the pump housing between the pump housing and the stator support piece. In this way, the set of control electronics can be fixed in the pump housing, and furthermore protected from the fluid in the wet region. The set of control electronics, and in particular a control circuit board, may advantageously be arranged with a fixing opening around the fixing collar of the stator support piece. The control circuit board may then be clamped perpendicularly with respect to the rotor shaft between the fixing collar and the pump housing. To be able to clamp the control circuit board, the fixing collar of the stator support piece may have multiple integrally formed clamping ribs. The clamping ribs may be formed around the fixing collar and form a projection around the fixing collar, on which the set of control electronics and in particular the control circuit board can be arranged so as to be supported. If the set of control electronics is formed by the control circuit board, and if the set of control electronics has an electronics component, the electronics component may be fixed to the control circuit board and at least regionally extend through the latter. The electronics component may for example be a capacitor or some other electronics component that requires cooling. In this advantageous manner, the fluid pump can be designed to be more compact, and furthermore the electronics component can be cooled more effectively.

In one advantageous refinement of the fluid pump according to the invention, provision is made for the pump housing to be composed of a thermally conductive material, preferably of aluminium or of an aluminium alloy. The pump housing composed of a thermally conductive material can more effectively dissipate the heat generated in the stator to the outside, whereby the stator in the stator support piece is cooled more effectively. Furthermore, by means of the pump housing composed of aluminium or of an aluminium alloy, owing to a relatively high stiffness of these materials, the two bearing points of the rotor shaft in the pump housing can also be stiffened.

To improve the cooling of the stator support piece and of the stator, provision is advantageously made for the fluid pump to have a comb-type cooling arrangement with at least one rotor rib and with at least one housing rib. The at least one housing rib projects from the pump housing and is formed so as to encircle the rotor shaft. Correspondingly, the at least one rotor rib is formed so as to project from the rotor and so as to encircle the rotor shaft. The at least one housing rib and the at least one rotor rib are, radially with respect to the rotor shaft, arranged alternately and parallel with respect to one another. The comb-type cooling arrangement preferably has multiple housing ribs which project perpendicularly from the pump housing, and multiple rotor ribs which project perpendicularly from the rotor, which housing ribs and rotor ribs engage into one another in a comb-like manner. By means of the comb-type cooling arrangement, the fluid to be pumped can be mixed more effectively in the cavity of the stator support piece around the rotor, and the stator support piece and the rotor can be cooled more effectively.

Provision is advantageously made for the rotor shaft to have a cavity which encloses the axis of rotation, wherein the cavity is connected in fluid-conducting fashion to the wet region. The cavity expediently extends coaxially with respect to the axis of rotation through the entire rotor shaft, such that the rotor shaft can also be cooled from the inside by means of the fluid to be pumped. Preferably, the cavity is formed by an axial passage bore in the rotor shaft, which axial passage bore connects the pump impeller wet region of the pump impeller housing to the wet region of the pump housing. For this purpose, in the rotor shaft, there may be provided multiple radial openings which extend through the rotor shaft in a radially outward direction from the axial passage bore. The multiple radial openings in the rotor shaft may correspond to radial openings in the first bearing point, such that the fluid to be pumped can flow through the openings in the first bearing point out of the wet region into the passage bore of the rotor shaft, and onwards to the pump impeller wet region. In the operating state of the fluid pump, a negative pressure prevails upstream of the pump impeller in the pump impeller wet region, and a positive pressure prevails downstream of the pump impeller in the wet region, in the fluid to be pumped. By means of the axial pressure difference that arises in the fluid pump, the fluid to be pumped flows from the wet region through the openings in the first bearing point into the passage bore of the rotor shaft, and through the passage bore into the pump impeller wet region, such that the rotor shaft and the rotor can be cooled more effectively. The first bearing point may in this case have a circular-segment-shaped cross section in order to permit a flow of the fluid to be pumped through the bearing point. Altogether, in the fluid pump according to the invention, by means of the stator support piece enclosing the stator, the stator can be cooled more efficiently, and the fluid pump can be designed to be more compact.

Further important features and advantages of the invention will emerge from the subclaims, from the drawing and from the associated figure description on the basis of the drawing.

It is self-evident that the features mentioned above and the features yet to be discussed below may be used not only in the respectively specified combination, but also in other combinations or individually, without departing from the scope of the present invention.

Preferred exemplary embodiments of the invention are illustrated in the drawing and will be discussed in more detail in the following description.

BRIEF DESCRIPTION OF THE DRAWINGS

In the drawings, in each case schematically

DETAILED DESCRIPTION

Figure 1:
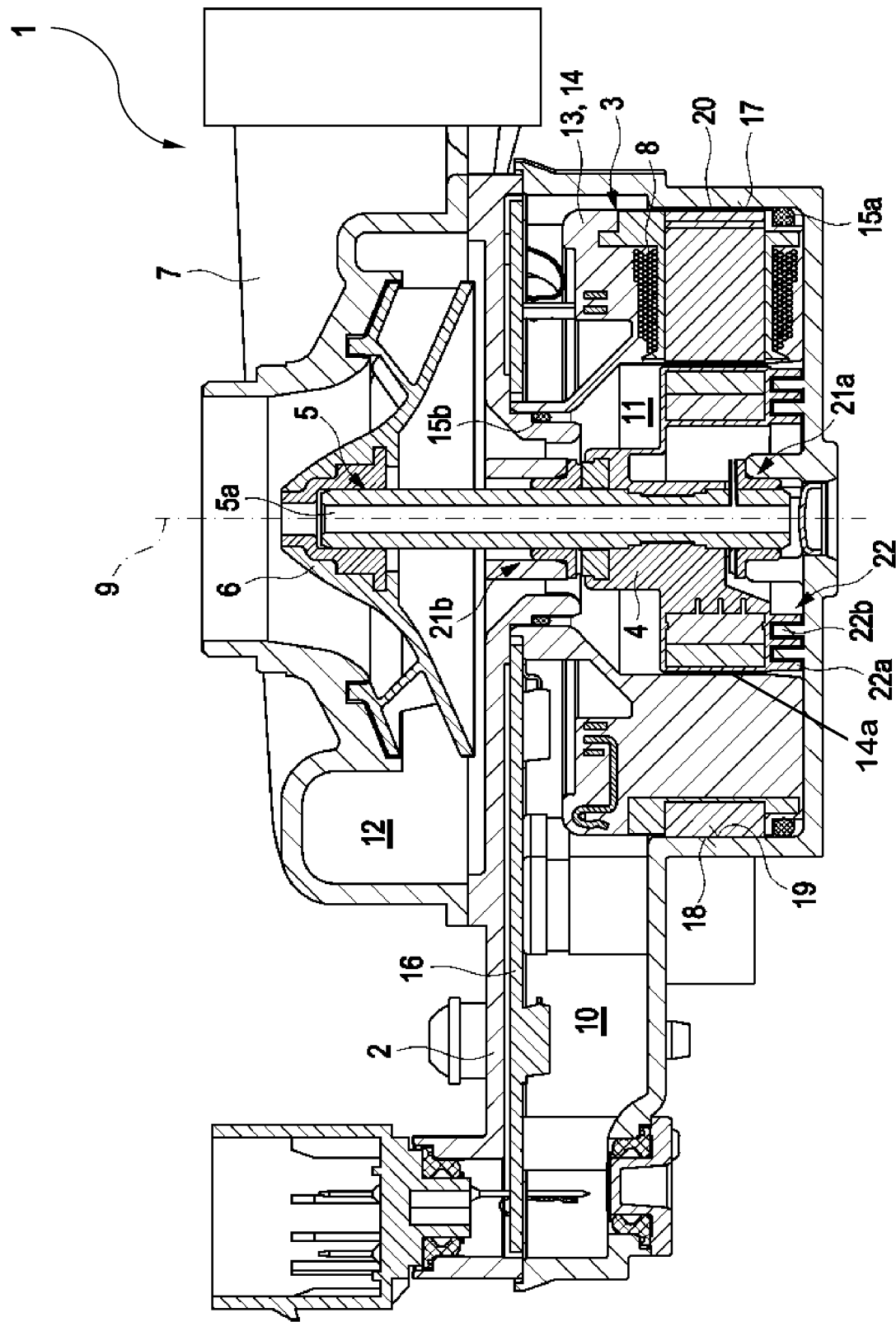
FIG. 1 shows a view of a fluid pump according to the invention having a pump housing and having an electric motor.

FIG. 1 shows a view of a fluid pump 1 having a pump housing 2 and having an electric motor 3 arranged in the pump housing 2. A rotor 4 of the electric motor 3 has a rotor shaft 5, which connects the rotor 4 in terms of drive to a pump impeller 6. The rotor shaft 5 has a cavity 5a through which a fluid can flow and which improves the cooling of the rotor shaft 5. The pump impeller 6 is arranged in a pump impeller housing 7, wherein the pump impeller housing 7 is fixed to the pump housing 2. The rotor 4 is mounted in a stator 8 of the electric motor 3 so as to be rotatable about an axis of rotation 9, and is, for cooling purposes, surrounded by the fluid. The pump housing 2 is divided into a dry region 10 and a wet region 11 which comprises the rotor 4. A pump impeller wet region 12 of the pump impeller housing 7 is in this case connected in fluid-conducting fashion to the wet region 11 of the pump housing 2 and to the cavity 5a of the rotor shaft 5. The dry region 10 and the wet region 11 are separated, in the pump housing 2, by a stator support piece 13 which encloses the stator 8 and which, in this exemplary embodiment, is a plastics body 14, which may include a protective layer 14a. Between the pump housing 2 and the stator support piece 13, there are arranged seals 15a and 15b, which seal off the dry region 10 from the wet region 11. In this way, it is possible in particular for a set of control electronics 16—in this case a control circuit board 23—arranged in the dry region 10 to be protected.

A shell surface 17 of the stator support piece 13 is, in this exemplary embodiment, formed by a radially outwardly directed outer surface 18 of the stator 8. The stator support piece 13 bears with the shell surface 17 against an inner surface 19 of the pump housing 2. The heat generated in the stator 8 can, in this way, be released by the outer surface 18 of the stator 8 directly to the pump housing 2, and the stator 8 can consequently be cooled more efficiently. Furthermore, a thermally conductive coating 20—for example a thermally conductive paste—is arranged between the shell surface 17 of the stator support piece 13 and the inner surface 19 of the pump housing 2, which thermally conductive coating further improves the release of heat from the stator 8 to the pump housing 2. In this exemplary embodiment, the rotor 4 is mounted within the pump housing 2 at a first bearing point 21a and at a second bearing point 21b. In this way, the fluid pump 1 can be of compact and modular design. The stator support piece 13 may be formed by a plastics body, which may have a protective layer on an inner surface facing towards the rotor, which protective layer protects the plastics body from the fluid to be pumped.

The fluid pump 1 furthermore has a comb-type cooling arrangement 22, which has multiple rotor ribs 22a and multiple housing ribs 22b. The housing ribs 22b are formed on the pump housing 2 in a perpendicularly projecting and integral manner, and encircle the rotor shaft 5. The rotor ribs 22a are formed on the rotor 4 so as to project perpendicularly and so as to encircle the rotor shaft 5. The housing ribs 22b are arranged in alternating fashion and parallel to the rotor ribs 22a. The comb-type cooling arrangement 22 additionally improves the cooling of the stator 8 in the stator support piece 13.

Figure 2:
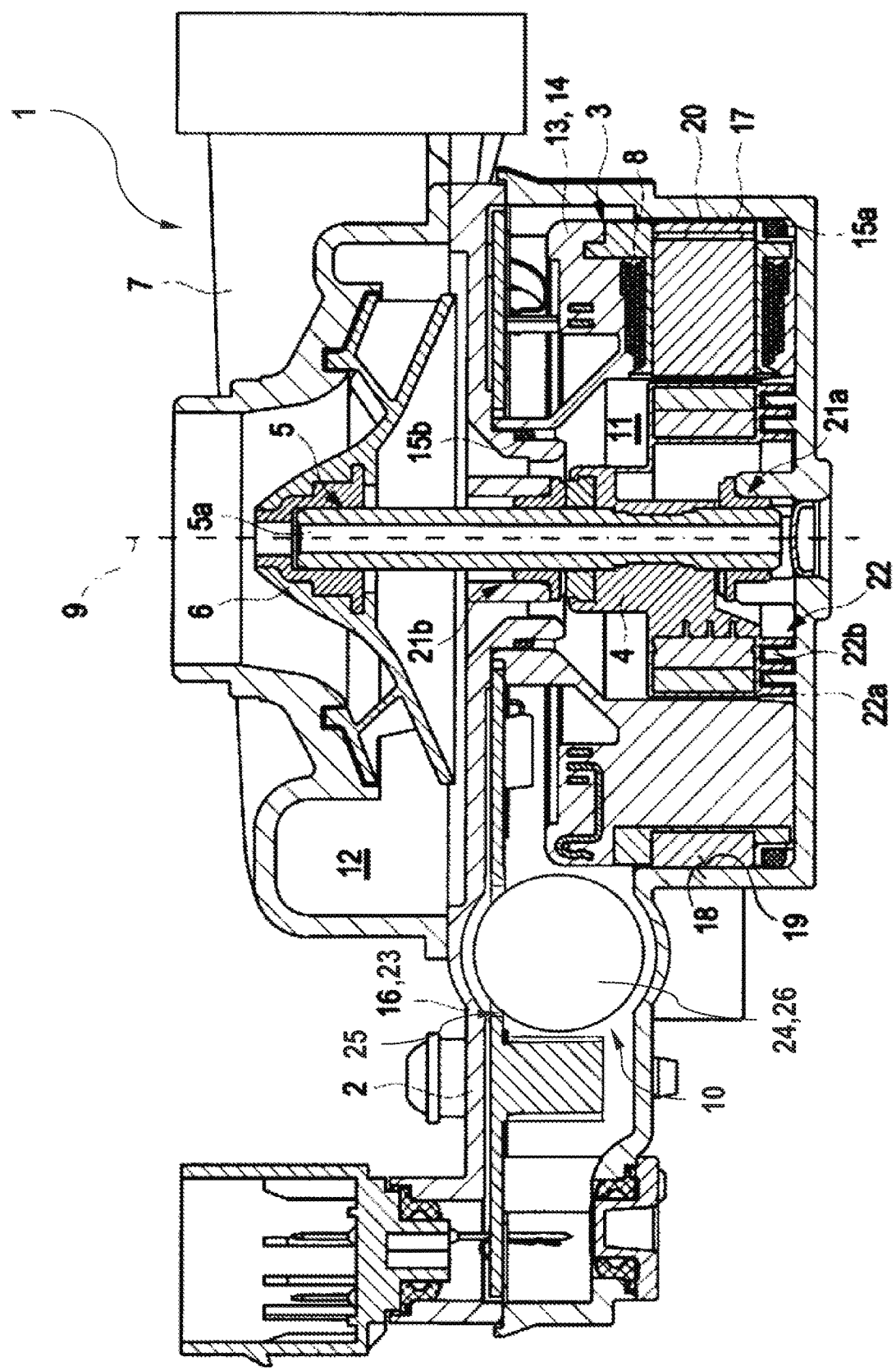
FIG. 2 shows a view of a fluid pump according to the invention with an alternatively designed set of control electronics.

FIG. 2 shows a view of the fluid pump 1 according to the invention with the alternatively designed set of control electronics 16 and the alternatively designed control circuit board 23. Here, an electronics component 24—in this case a capacitor 26—is fixed to the control circuit board 23, which electronics component extends through the control circuit board 23 through a component opening 25. In this way, the electronics component 24 can be cooled more effectively, and the fluid pump 1 can be of altogether more compact design. The fluid pump 1 shown here otherwise corresponds to the fluid pump in FIG. 1.

Altogether, in the fluid pump 1 according to the invention, by means of the stator support piece 13 that encloses the stator 8, the stator 8 can be cooled more efficiently, and the fluid pump 1 can be designed to be compact.

The invention claimed is:

1. An electric fluid pump comprising:
    a pump housing;
    an electric motor arranged in the pump housing and having a rotor and a stator; and
    a pump impeller, which is connected to and driven by the rotor, in a pump impeller housing;
    wherein the rotor has a rotor shaft, and is mounted in the stator so as to be rotatable about an axis of rotation;
    wherein the pump housing is divided into a dry region and a wet region in which the rotor is disposed;
    wherein the dry region and the wet region are separated by a stator support piece which at least partially encloses the stator;
    wherein a shell surface is directed radially outward and abuts against an inner surface of the pump housing;
    wherein the rotor shaft has a cavity, which encloses the axis of rotation, wherein the cavity fluidly connects a pump impeller wet region of the pump impeller housing to the wet region of the pump housing; and
    wherein the rotor shaft has radial openings through which the fluid is flowable radially from the wet region of the pump housing into the cavity.

2. The fluid pump according to claim 1, wherein the stator support piece is a plastic body into which the stator is at least partially embedded.

3. The fluid pump according to claim 2, wherein at least one of:
    the plastic body is produced from a thermally conductive plastic; and
    the plastic body has a protective layer on an inner surface facing the rotor.

4. The fluid pump according to claim 3, wherein at least one of:
    the plastic body is produced from the thermally conductive plastic via a first single-stage or multi-stage plastics overmoulding process; and
    the protective layer is produced from a fluid-resistant plastic via a second plastics overmoulding process.

5. The fluid pump according to claim 3, wherein at least one of:
    the thermally conductive plastic of the plastic body has a specific volume resistance of greater than $10^{10}$ $\Omega$*m and a thermal conductivity of greater than 6 W/(m*K); and
    a fluid-resistant plastic from which the protective layer is produced has a thermal conductivity of less than 2 W/(m*K).

6. The fluid pump according to claim 1, wherein the dry region is sealed off at least one of radially and axially from the wet region via at least one seal, which abuts against the stator support piece.

7. The fluid pump according to claim 1, wherein the stator support piece is fixed to the pump housing such that the dry region is sealed off at least one of radially and axially from the wet region.

8. The fluid pump according to claim 1, wherein a thermally conductive coating is arranged between the shell surface of the stator support piece and the inner surface of the pump housing.

9. The fluid pump according to claim 1, wherein a first bearing point and a second bearing point of the rotor are arranged within the pump housing.

10. The fluid pump according to claim 9, wherein the stator support piece has a fixing collar arranged around the second bearing point, and separating the wet region at least one of axially and radially from the dry region.

11. The fluid pump according to claim 1, wherein the stator support piece with the stator is fixed at least one of axially and radially to the pump housing in a non-positively locking, a cohesive, or a positively locking fashion.

12. The fluid pump according to claim 9, wherein the first bearing point has openings aligned with the radial openings in the rotor shaft through which the fluid is flowable radially from the wet region into the cavity.

13. The fluid pump according to claim 1, further comprising a set of control electronics fixed in a non-positively locking, a positively locking, or a cohesive fashion in the dry region of the pump housing between the pump housing and the stator support piece.

14. The fluid pump according to claim 13, wherein the set of control electronics has a fixing opening around a fixing collar of the stator support piece, and the set of control electronics is arranged perpendicularly with respect to the rotor shaft between the fixing collar and the pump housing.

15. The fluid pump according to claim 14, wherein the fixing collar of the stator support piece has multiple integrally formed ribs which are formed around the fixing collar and on which the set of control electronics is arranged so as to be supported.

16. The fluid pump according to claim 1, wherein the pump housing is composed of a thermally conductive material.

17. The fluid pump according to claim 1, wherein at least one housing rib projects from the pump housing and is formed so as to encircle the rotor shaft, wherein at least one rotor rib is formed so as to project from the rotor and so as to encircle the rotor shaft, and wherein the at least one housing rib and the at least one rotor rib are arranged alternately and parallel with respect to one another.

18. The fluid pump according to claim 1, wherein a set of control electronics includes a control circuit board and an electronics component fixed to the control circuit board and at least regionally extending through a component opening in the control circuit board.

19. An electric fluid pump comprising:
a pump housing;
an electric motor arranged in the pump housing and having a rotor; and
a pump impeller, which is connected to and driven by the rotor, arranged in a pump impeller housing;
wherein the rotor of the electric motor has a rotor shaft, and is mounted in a stator of the electric motor so as to be rotatable about an axis of rotation;
wherein the pump housing is divided into a dry region and a wet region in which the rotor is disposed;
wherein the dry region and the wet region are separated by a stator support piece which at least partially encloses the stator;
wherein a pump impeller wet region of the pump impeller housing is connected in fluid-conducting fashion to the wet region of the pump housing;
wherein a set of control electronics is fixed in a non-positively locking, a positively locking, or a cohesive fashion in the dry region of the pump housing between the pump housing and the stator support piece;
wherein the set of control electronics has a fixing opening around a fixing collar of the stator support piece and is arranged perpendicularly with respect to the rotor shaft between the fixing collar and the pump housing; and
wherein the fixing collar of the stator support piece has multiple integrally formed ribs which are formed around the fixing collar and on which the set of control electronics is arranged so as to be supported.

* * * * *